(12) United States Patent
Murasugi

(10) Patent No.: US 6,350,214 B1
(45) Date of Patent: Feb. 26, 2002

(54) HYDRAULIC CONTROL DEVICE OF AUTOMATIC TRANSMISSION

(75) Inventor: Takashi Murasugi, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/598,640

(22) Filed: Jun. 21, 2000

(30) Foreign Application Priority Data

Jun. 29, 1999 (JP) .......................................... 11-183837

(51) Int. Cl.$^7$ .............................................. F16H 61/08
(52) U.S. Cl. ...................................................... 475/128
(58) Field of Search .............................. 475/116, 127, 475/128, 129, 130

(56) References Cited

U.S. PATENT DOCUMENTS 5,836,845 A * 11/1998 Sakaguchi et al. ....... 475/127 X
5,888,169 A * 3/1999 Jang ........................ 475/128 X

FOREIGN PATENT DOCUMENTS

JP  8-121586  5/1996

* cited by examiner

*Primary Examiner*—Charles A Marmor
*Assistant Examiner*—Ankur Parekh
(74) *Attorney, Agent, or Firm*—Foley & Lardner

(57) ABSTRACT

During a shifting operation that a first engaging element is changed from an engaged state to a disengaged state, a fail-safe valve is used to forcibly drain a first engaging-element pressure from the first engaging element by using a second engaging-element pressure applied to a second engaging element brought into an engaging state from a releasing state. The fail-safe valve includes a spool and uses the second engaging-element pressure acting on the spool in one axial direction and an opposing pressure acting on the spool in the opposing direction as operating signal pressures. The fail-safe valve is switchable to a drain position, when the second engaging-element pressure is regulated toward a specified fail-safe valve operating point pressure higher than a maximum pressure value of the second engaging-element pressure regulated during the shifting operation and lower than a maximum possible engaging-element pressure.

7 Claims, 11 Drawing Sheets

FIG.3

|      | L/C | H/C | R/C | 2-4B | L&R/B |
|------|-----|-----|-----|------|-------|
| R    |     |     | ◯   |      | ◯     |
| 1ST  | ◯   |     |     |      | (◯)   |
| 2ND  | ◯   |     |     | ◯    |       |
| 3RD  | ◯   | ◯   |     |      |       |
| 4TH  |     | ◯   |     | ◯    |       |

HYDRAULIC CONTROL DEVICE OF AUTOMATIC TRANSMISSION

BACKGROUND OF THE INVENTION

1. Field of the Invention

The present invention relates to a hydraulic control device of an automatic transmission, and specifically to hydraulic technologies for a hydraulic control device of an electronically-controlled automatic transmission capable of electronically controlling an engaging pressure of each of engaging elements or controlling elements such as clutches and brake bands directly by means of a transmission ECU (electronic control unit), and of providing simplified hydraulic circuits, reduced hydraulic component parts, small-sized valve bodies, and expanded design flexibility, and lighter hydraulic packages.

2. Description of the Prior Art

In recent years, there have been proposed and developed various electronically-controlled automatic transmissions of simplified hydraulic circuits, reduced hydraulic component parts, and small- sized valve bodies. One such electronically-controlled transmission (which will be hereinafter abbreviated to an "ECT transmission") has been disclosed in Japanese Patent Provisional Publication No. 8-121586. The ECT transmission disclosed in the Japanese Patent Provisional Publication No. 8-121586, has a low-and-reverse brake (L&R/B) pressure control device through which a low-and-reverse brake (L&R/B) is applied or engaged in a drive range and first gear, and released or disengaged in a drive range and either of second, third and fourth (overdrive) gears. In more detail, as shown in FIG. 12, the above-mentioned low-and-reverse brake (L&R/B) pressure control device uses two different hydraulic pressures, namely one being a second brake pressure $P_{2ND}$ which is applied to a second brake for the purpose of applying the second brake in a drive range and second gear or in a drive range (D range) and fourth gear (OD gear), and the other being an overdrive clutch pressure $P_{OD}$ which is applied to an overdrive clutch for the purpose of engaging the overdrive clutch in a drive range and third gear or in a drive range and fourth gear. The low-and-reverse brake (L&R/B) pressure control device functions to forcibly drain the pressure supply line of the low-and-reverse brake in the D range and 2nd gear, in the D range and 3rd gear, or in the D range and 4th gear, in which at least one of the second brake pressure $P_{2ND}$ and the overdrive clutch pressure $P_{OD}$ are created or produced.

SUMMARY OF THE INVENTION

In the hydraulic control device of the electronically-controlled automatic transmission disclosed in the Japanese Patent Provisional Publication No. 8-121586, however, during shifting from first to second gear wherein the low-and-reverse brake (L&R/B) is changed from its applied state to its released state, the pressure supply line of the low-and-reverse brake pressure is forcibly drained by using the second brake pressure $P_{2ND}$ for the second brake. During the shifting from 1st to 2nd gear, on the other hand, the second brake is changed from its released state to its applied state. The prior art hydraulic control device is designed so that, during the shifting from 1st to 2nd gear, a line pressure $P_L$, varying depending on engine speed, acts on one side of a land opposing the other side of the land on which the second brake pressure $P_{2ND}$ is applied. In other words, the line pressure $P_L$ serves as an opposing pressure to the second brake pressure $P_{2ND}$. For the reasons discussed above, it is difficult to precisely control a timing of forcible draining of working oil from the pressure supply line of the low-and-reverse brake by using the line pressure $P_L$ as the opposing pressure. That is, the prior art hydraulic control device has the following drawbacks.

(A) When the second brake pressure $P_{2ND}$ lower than a maximum hydraulic pressure level during shifting is used as a valve-position switching pressure, there is an increased tendency for the low-and-reverse brake (L&R/B) pressure to be forcibly released before termination of the shifting from 1st to 2nd gear. This exerts a bad influence upon the automatic shifting control. Actually, during the shifting operation from first to second gear, a delicate control for pressure-release from the low-and-reverse brake and a delicate control for pressure-application to the second brake have to cooperate with each other so as to realize a shifting operation without any shift shock. If the low-and-reverse pressure drops down to essentially atmospheric pressure by way of the previously-noted forcible draining before termination of the shifting from 1st to 2nd gear, a lack of total engaging capacity in both the low-and-reverse brake and the second brake may occur, and thus results in an undesirable rise in engine speed. This acts as a new factor in the causation of shift shock.

(B) When the second brake pressure $P_{2ND}$ equal to the maximum hydraulic pressure level during shifting is used as a valve-position switching pressure, there is an increased tendency for the low-and-reverse brake (L&R/B) pressure to be forcibly released after the application or engagement of the second brake has been completed. Therefore, assuming that the low-and-reverse brake (L&R/B) pressure is unexpectedly kept at a high level owing to a system failure, during a particular time period from a time when the shifting operation ends to a time when the previously-noted forcible draining starts, the automatic transmission will fall into a so-called interlocking state in which the low-and-reverse brake and the second brake are both applied or engaged.

Accordingly, it is an object of the invention to provide a hydraulic control device of an automatic transmission, which avoids the aforementioned disadvantages of the prior art.

It is another object of the invention to provide a hydraulic control device of an electronically-controlled automatic transmission, which has a fail-safe function capable of providing an optimal timing of a forcible pressure-release of an engaging-element pressure (simply, an engaging pressure) applied to an engaging element or an optimal timing of a forcible oil drain from the engaging element, without exerting a bad influence upon an automatic shifting control and without providing an undesired automatic transmission interlock in presence of a system failure.

In order to accomplish the aforementioned and other objects of the present invention, a hydraulic control device of an automatic transmission having a first engaging element engageable or disengageable by a first engaging-element pressure regulated during shifting, a solenoid valve creating a solenoid pressure in response to a solenoid drive signal, and a pressure regulator valve creating the first engaging-element pressure applied to the first engaging element by using the solenoid pressure and a regulated line pressure thereof as operating signal pressures, comprises a fail-safe valve adapted to forcibly drain the first engaging-element pressure from the first engaging element by using a second engaging-element pressure applied to a second engaging element brought into an engaging state from a releasing state during a shifting operation during which the first engaging element is changed from an engaged state to a disengaged state, the fail-safe valve including a spool and using the second engaging-element pressure acting on the spool in one axial direction and an opposing pressure acting on the spool in the opposing direction as operating signal pressures, and the fail-safe valve switching to a drain position when the second engaging-element pressure is regulated toward a specified fail-safe valve operating point pressure higher than a maximum pressure value of the second engaging-element pressure regulated during the shifting operation and lower than a maximum possible engaging-element pressure.

It is more preferable that the fail-safe valve uses a third engaging-element pressure applied to a third engaging element already kept in an engaged state in addition to the second engaging-element pressure to forcibly drain the first engaging-element pressure during the shifting operation, and the fail-safe valve has at least two valve construction including at least a first fail-safe valve having a spool operable by the second engaging-element pressure and the opposing pressure, both serving as operating signal pressures for the first fail-safe valve, and a second fail-safe valve having a spool operable by the third engaging-element-pressure and the opposing pressure, both serving as operating signal pressures for the second fail-safe valve, and the first and second fail-safe valves are operable independently of each other. Preferably, the fail-safe valve may be disposed upstream of the pressure regulator valve, and thus the fail-safe valve can operate to forcibly drain an input pressure line for the pressure regulator valve during a fail-safe operating mode. More preferably, a fail-safe pressure valve is provided to create the opposing pressure acting on the spool of the fail-safe valve in the opposing direction, and the fail-safe pressure valve has a spool having the same pressure-intensified ratio as the pressure regulator valve and uses a line pressure as an input pressure, and the spool of the fail-safe pressure valve receives at one end a pilot pressure acting in one axial direction and receives at another end an output pressure acting in the opposite direction.

BRIEF DESCRIPTION OF THE DRAWINGS

FIG. 3 is a chart of clutch engagements and band applications for R range and D range of transmission operating conditions in the ECT transmission to which the hydraulic control device of the embodiment can be applied.

DESCRIPTION OF THE PREFERRED EMBODIMENTS

Figure 2:
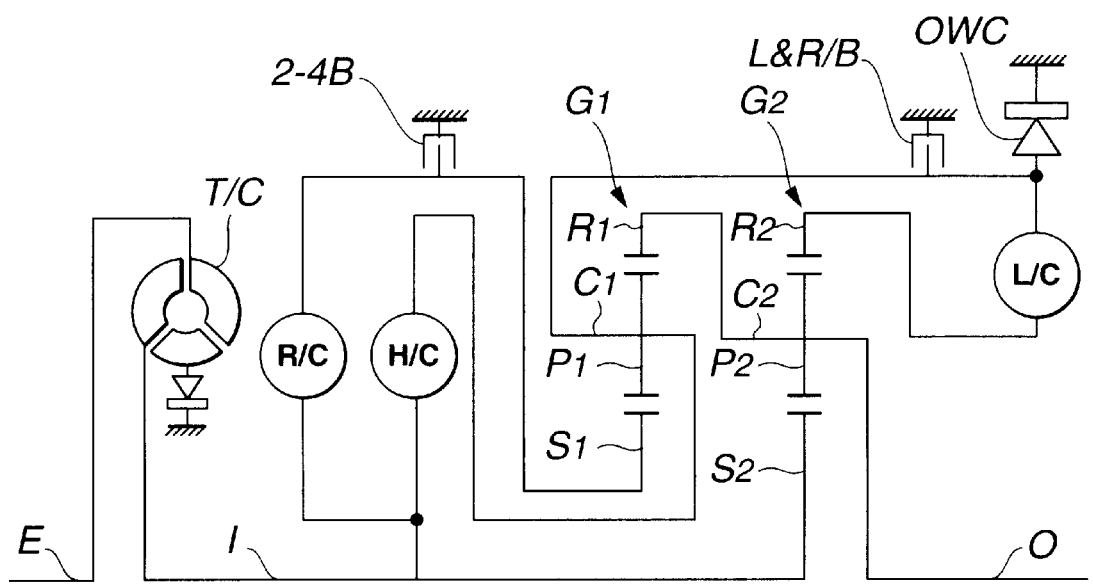
FIG. 2 is a schematic view illustrating a power train to which a hydraulic control device of an embodiment can be applied.

Referring now to the drawings, particularly to FIG. 2, the hydraulic control device of the invention is exemplified in an electronically-controlled automatic transmission (ECT transmission) using a lock-up torque converter with a lock-up clutch. In the power-train layout shown in FIG. 2, E denotes an engine output shaft (an engine crankshaft), I denotes a transmission input shaft, and O denotes a transmission output shaft. A torque converter T/C is disposed between the engine output shaft E and the transmission input shaft I, to couple the engine with the power train. Two sets of planetary gearsets, namely a first planetary gearset G1 and a second planetary gearset G2, are provided between the transmission input shaft I and the transmission output shaft O. The first planetary gearset G1 is comprised of a simple planetary gearset consisting of a first pinion P1 (usually, a plurality of planet pinions), a first pinion carrier C1, a first sun gear S1, and a first ring gear R1, whereas the second planetary gearset G2 is comprised of a simple planetary gearset consisting of a second pinion P2 (usually, a plurality of planet pinions), a second pinion carrier C2, a second sun gear S2, and a second ring gear R2. The transmission input shaft I is connected directly to the second sun gear S2 generally by way of spline connection. A reverse clutch R/C is provided in the middle of a first member through which the transmission input shaft I is connectable to the first sun gear S1. In order to be able to fixedly connect the above-mentioned first member to the transmission case, a 2–4 brake (2–4/B) is also provided. The 2–4 brake has a multi-disk brake structure. A high clutch H/C is provided in the middle of a second member through which the transmission input shaft I is connectable to the first pinion carrier C1. A low clutch L/C is provided in the middle of a third member through which the first pinion carrier C1 is connectable to the second ring gear R2. In order to be able to fixedly connect the previously-noted third member to the transmission case, a low-and-reverse brake L&R/B is provided. The low-and-reverse brake L&R/B has a multi-disk brake structure. In parallel with the low-and-reverse brake L&R/B, a one-way clutch OWC is also provided. As seen in FIG. 2, the first ring gear R1 is connected directly to the second pinion carrier C2. The second pinion carrier C2 is connected directly to the transmission output shaft O generally by way of spline connection.

Figure 3:
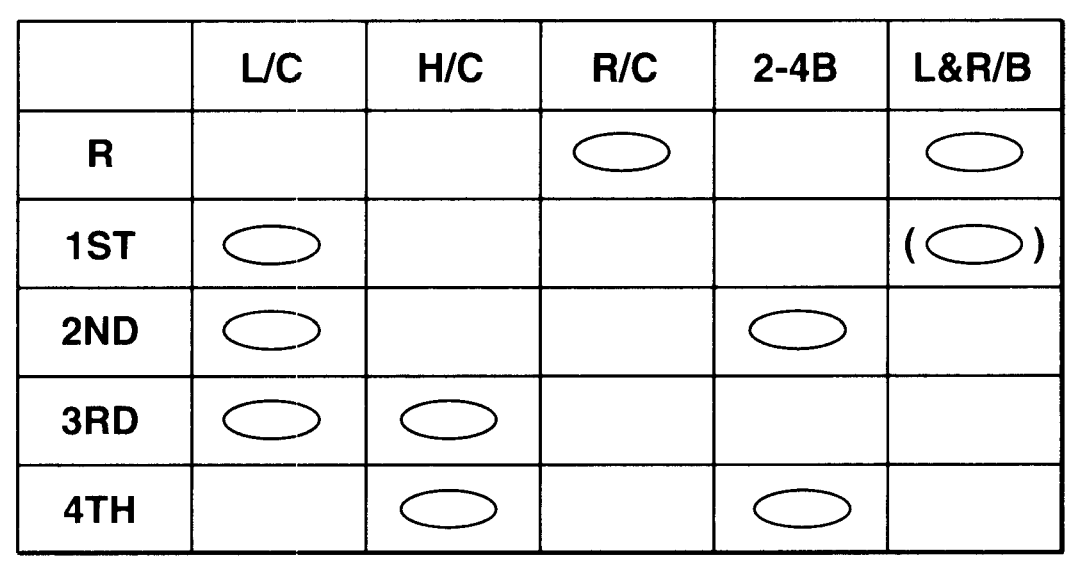

Referring now to FIG. 3, there is shown a preprogrammed logical table for clutch engagements and band applications for reverse range (R), drive range (D) and first gear (1st), drive range (D) and second gear (2nd), drive range (D) and third gear (3rd), and drive range (D) and fourth gear (4th or OD) in the ECT transmission. In the logic table shown in FIG. 3, ○ denotes engagement of the clutch (L/C, H/C, R/C) or application of the brake (2–4/B, L&R/B). As seen from the logic table of FIG. 3, when the transmission is in reverse (R range), the reverse clutch R/C and the low-and-reverse brake L&R/B are both applied or engaged. When the transmission is in D range and first gear, the low clutch L/C is engaged. When the transmission is in D range and second gear, the low clutch L/C and the 2–4 brake 2–4/B are both applied or engaged. When the transmission is in D range and third gear, the low clutch L/C and the high clutch H/C are both engaged. When the transmission is in D range and fourth gear, the high clutch H/C and the 2–4 brake 2–4/B are both engaged or applied. When the transmission operates in low range (L) hold mode (HOLD) and first gear, the low clutch L/C and the low-and-reverse brake L&R/B are both engaged or applied.

Figure 4:
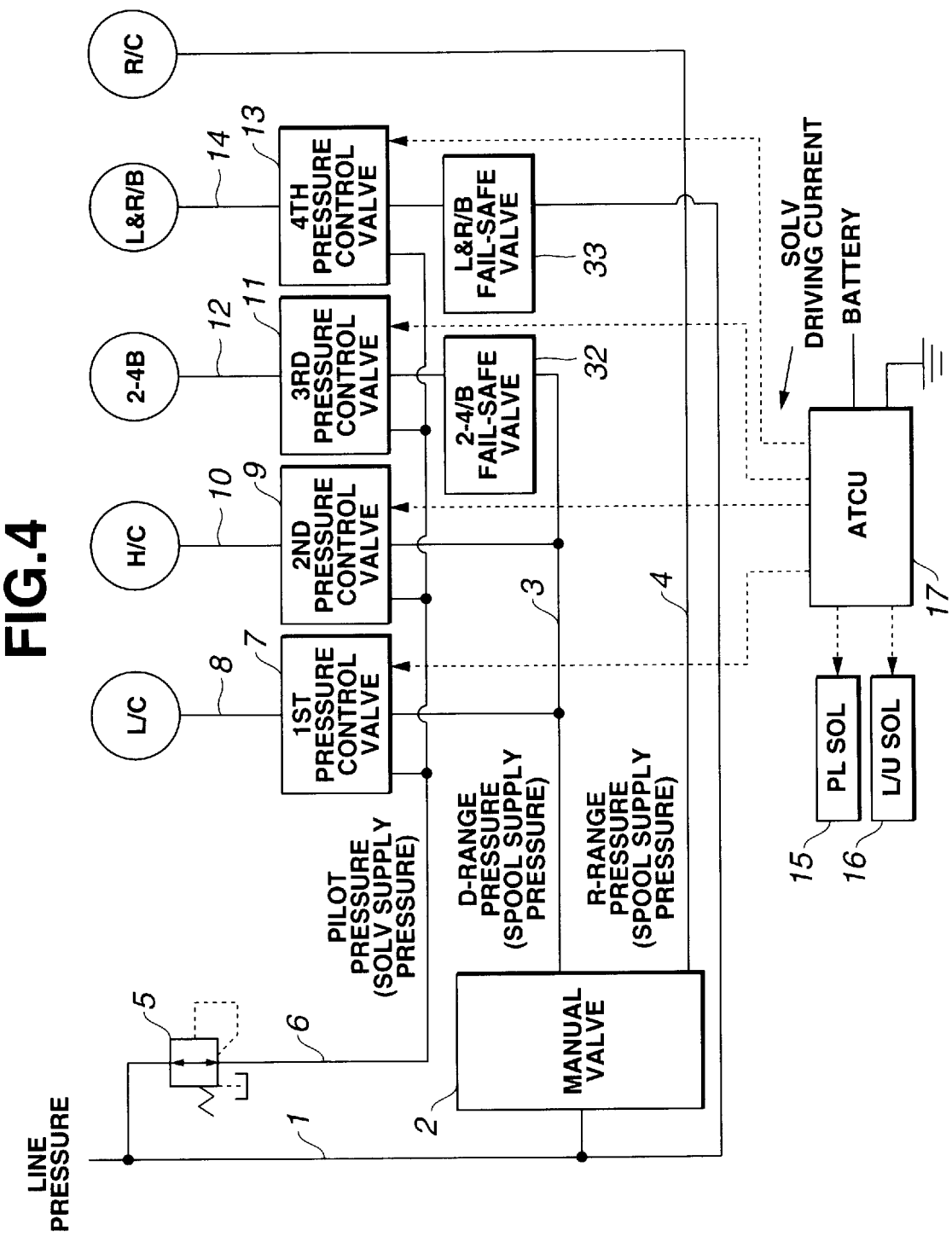
FIG. 4 is a system diagram illustrating an automatic shift control system in the ECT transmission to which the hydraulic control device of the embodiment can be applied.
Figure 5:
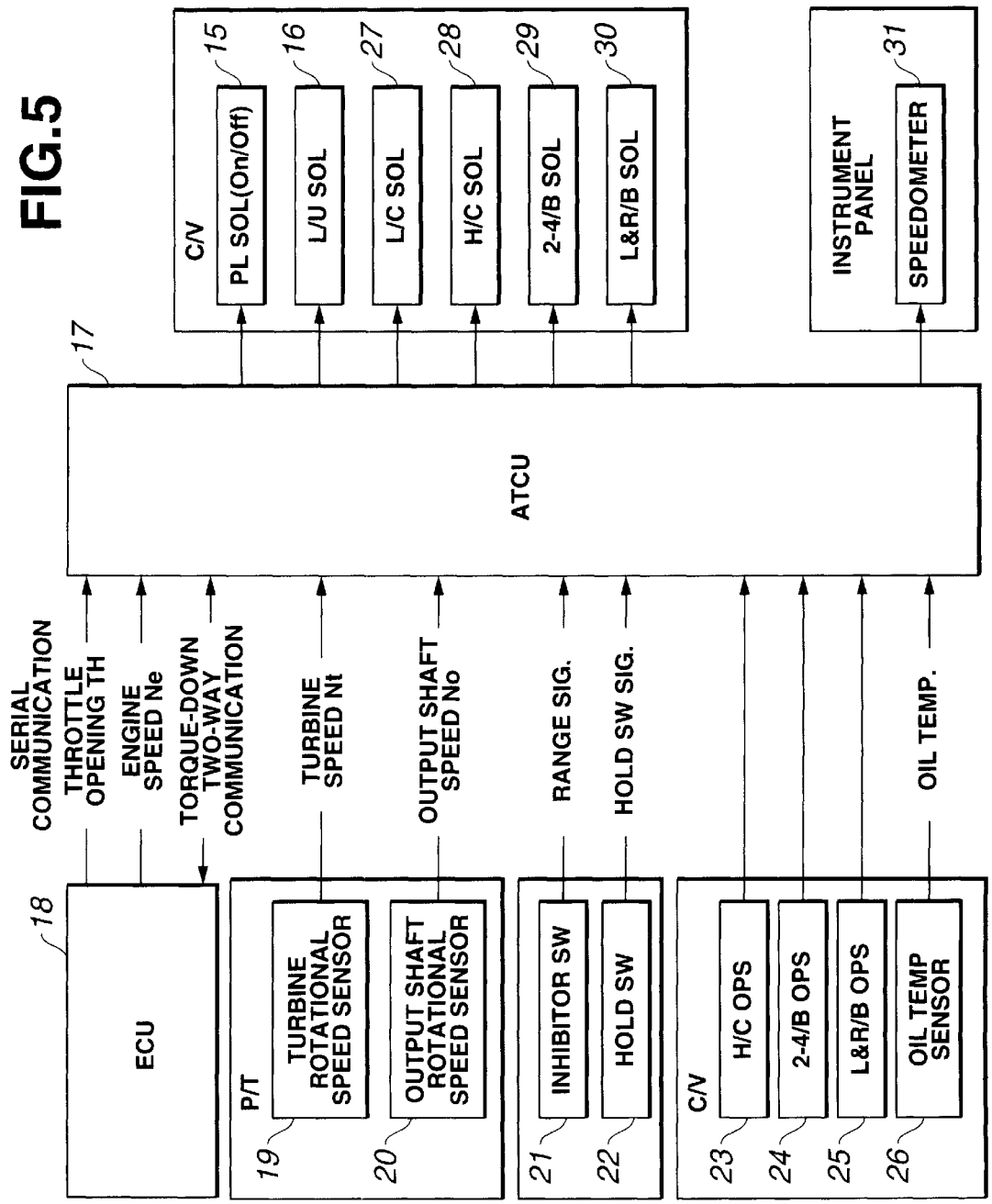
FIG. 5 is a block diagram of an electronic control system for the ECT transmission employing the hydraulic control device of the embodiment.

Referring to FIG. 4, there is shown the automatic shift control system containing a hydraulic control system and an automatic transmission control unit (ATCU) in the ECT transmission to which the hydraulic control device of the embodiment is actually applied. In FIG. 4, a line denoted by 1 is a line-pressure line for a line pressure $P_L$, a valve denoted by 2 is a manually-actuated valve, simply called a "manual valve", a line denoted by 3 is a drive-range (D-range) pressure line, and a line denoted by 4 is a reverse-range (R-range) pressure line. As appreciated, the manual valve 2 is mechanically linked via a linkage to a transmission selector lever (or a control lever) to provide a driver's manual selection from various selector-lever positions, such as L or 1, 2, D, N, R, and P range positions. When the D range position is selected, the manual valve 2 operates to connect the line-pressure line 1 to the D-range pressure line 3. On the other hand, when the R range position is selected, the manual valve 2 operates to connect the line-pressure line 1 to the R-range pressure line 4. In FIG. 4, reference sign 5 denotes a pilot valve, while reference sign 6 denotes a pilot-pressure line. The pilot valve 5 is provided to reduce the line pressure $P_L$ fed from the line-pressure line 1 into the pilot-pressure line 6 to a predetermined constant pilot pressure. Reference signs 7, 9, 11, and 13 respectively denote first, second, third, and fourth pressure control valves. The first pressure control valve 7 includes a low-clutch (L/C) amplifier valve and a duty-cycle controlled low-clutch (L/C) solenoid 27. The first pressure control valve 7 is provided to create a low clutch pressure ($P_{L/C}$) from the D-range pressure $P_D$. The low clutch pressure ($P_{L/C}$) created by the first pressure control valve 7 is fed via a low clutch pressure line 8 to the low clutch L/C. The second pressure control valve 9 includes a high-clutch (H/C) amplifier valve and a duty-cycle controlled high-clutch (H/C) solenoid 28. The second pressure control valve 9 is provided to create a high clutch pressure ($P_{H/C}$) from the D-range pressure $P_D$. The high clutch pressure ($P_{H/C}$) created by the second pressure control valve 9 is fed via a high clutch pressure line 10 to the high clutch H/C. The third pressure control valve 11 includes a 2–4 brake (2–4/B) amplifier valve and a duty-cycle controlled 2–4 brake (2–4/B) solenoid valve 29 (simply, a 2–4/B solenoid). The third pressure control valve 11 is provided to create a 2–4 brake pressure ($P_{2-4/B}$) from the D-range pressure $P_D$. The 2–4 brake pressure ($P_{2-4/B}$) created by the third pressure control valve 11 is fed via a 2–4 brake pressure line 12 to the 2–4 brake (2–4/B). The fourth pressure control valve 13 includes a low-and-reverse brake (L&R/B) amplifier valve and a low-and-reverse brake (L&R/B) solenoid 30. The fourth pressure control valve 13 is provided to create a low-and-reverse brake pressure ($P_{L&R/B}$) from the line pressure $P_L$. The low-and-reverse brake pressure ($P_{L&R/B}$) created by the fourth pressure control valve 13 is fed via a low-and-reverse brake pressure line 14 to the low-and-reverse brake (L&R/B). In FIG. 4, reference sign 15 denotes an ON/OFF controlled pressure control solenoid which is provided for switching the line pressure ($P_L$) between a high-pressure mode and a low-pressure mode. Reference sign 16 denotes a duty-cycle controlled lock-up solenoid which is provided to activate (engage) or deactivate (disengage) the torque converter lock-up clutch. The previously-discussed pressure control valves 7, 9, 11 and 13, and the solenoid valves 15 and 16 are driven or energized by means of the electronic automatic transmission control unit (ATCU) 17. The input/output interface (I/O) of the ATCU 17 receives input information from an electronic engine control unit (ECU) 18, and various engine/vehicle switches and sensors (see the left-hand side of the block diagram shown in FIG. 5). Within the ATCU 17, a central processing unit (CPU) allows the access by the I/O interface of various input informational data signals, for example, an engine speed Ne, a throttle opening TH, a turbine speed Nt, a transmission output shaft speed No, a selected-range indicative signal, a hold switch signal, a H/C oil pressure switch signal, a 2–4/B oil pressure switch signal, a low-and-reverse brake oil pressure switch signal, an oil temperature sensor signal, and the like. The CPU of the ATCU is responsible for carrying the engine/transmission program stored in memories (RAM, ROM) and is capable of performing necessary arithmetic and logic operations containing an automatic shifting control routine. Computational results (arithmetic calculation results), that is, calculated output signals (solenoid drive currents) are relayed via the output interface circuitry of the ATCU 17 to output stages, namely the respective solenoids 15, 16, 27, 28, 29, and 30 (see the right-hand side of the block diagram shown in FIG. 5). In FIG. 4, reference sign 32 denotes a 2–4/B fail-safe valve. The 2–4/B fail-safe valve 32 is provided to forcibly drain the 2–4 brake pressure ($P_{2-4/B}$) from the 2–4 brake (2–4/B), when the transmission is in the D range and third gear in which the low clutch (L/C) pressure ($P_{L/C}$) and the high clutch (H/C) pressure ($P_{H/C}$) are both created through the first and second pressure control valves 7 and 9. Reference sign 33 denotes a low-and-reverse brake (L&R/B) fail-safe valve. The L&R/B fail-safe valve 33 is provided to forcibly drain the L&R/B pressure ($P_{L&R/B}$) from the low-and-reverse brake (L&R/B), when the transmission is in the D range and second gear, in the D range and third gear, or in the D range and fourth gear, in which at least one of the high clutch (H/C) and the 2–4/B pressure ($P_{2-4/B}$) is created. Hereunder described in reference to the block diagram shown in FIG. 5 are details of the electronic control system of the ECT transmission employing the hydraulic control device of the embodiment.

By way of serial communication, the input/output (I/O) interface of the ATCU 17 receives at least two engine/vehicle sensor signals from the electronic engine control unit (ECU) 18. One of the engine/vehicle sensor signals is a throttle opening sensor signal indicative of a throttle opening TH, and the other is an engine speed sensor signal indicative of an engine speed Ne. A torque-down two-way communication is performed between the ECU 18 and the ATCU 17. The I/O interface of the ATCU 17 also receives a turbine speed indicative signal Nt from a turbine speed sensor 19 and an output shaft speed indicative signal No from a transmission output shaft speed sensor 20. The turbine speed sensor 19 and the transmission output shaft speed sensor 20 are provided at the power train. Additionally, the I/O interface of the ATCU 17 receives various switch signals (that is, the selected-range indicative signal, the hold switch signal, the H/C oil pressure switch signal, the 2–4/B oil pressure switch signal, the L&R/B oil pressure switch signal) from an inhibitor switch 21, a hold switch 22, a H/C oil pressure switch 23, a 2–4/B oil pressure switch 24, and a L&R/B oil pressure switch 25. A high-level signal from the H/C oil pressure switch 23 indicates that the H/C is on (engaged). A high-level signal from the 2–4/B oil pressure switch 24 indicates that the 2–4 brake is on (applied). A high-level signal from the L&R/B oil pressure switch 25 indicates that the low-and-reverse brake (L&R/B) is on (applied). On the contrary, a low signal level from the respective oil pressure switch (OPS) means that the corresponding engaging element is off (released). Also, the oil-temperature indicative signal from an oil temperature sensor 26 is input into the I/O interface of the ATCU 17. Solenoid drive currents are output from the I/O interface of the ATCU 17 to the respective solenoids 15, 16, 27, 28, 29, and 30. As is generally known, the output shaft speed No monitored or sensed by the transmission output shaft speed sensor 20 is often used as a vehicle speed. The vehicle speed indicative signal (the transmission output shaft speed indicative signal) is used to indicate vehicle speed by means of a speedometer 31 built in an instrument panel.

Figure 6:
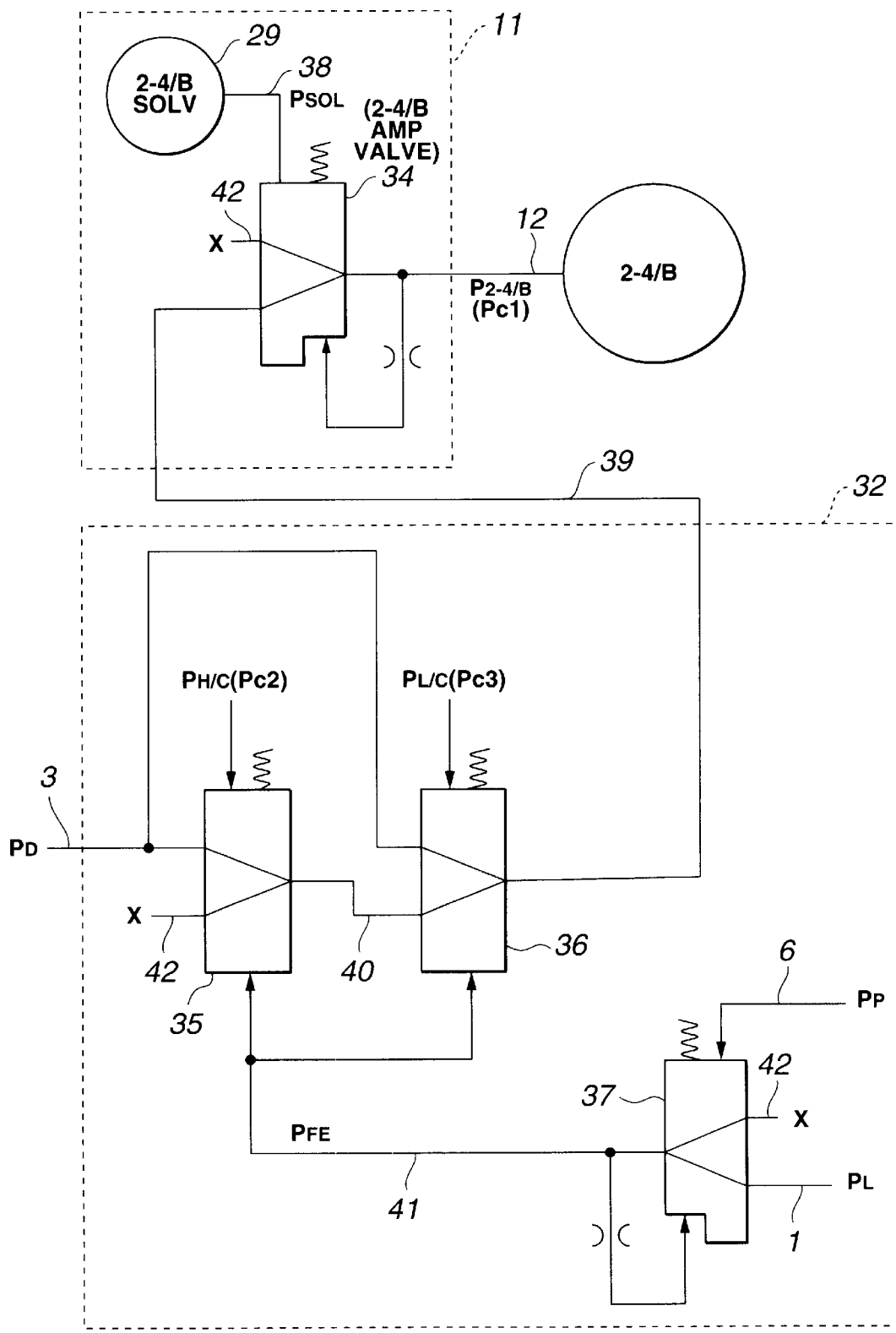
FIG. 6 is a hydraulic circuit diagram illustrating a 2–4/B pressure control circuit to which the hydraulic control device of the embodiment is applied.

Referring now to FIG. 6, there is shown a hydraulic circuit diagram of a 2–4 brake pressure control circuit to which the hydraulic control device of the embodiment is applied. In the hydraulic circuit diagram shown in FIG. 6, a 2–4 brake denoted by 2–4/B corresponds to a first engaging element a. Reference sign 1 denotes a line-pressure line, reference sign 3 denotes a D-range pressure line, reference sign 6 denotes a pilot-pressure line, reference sign 11 denotes a third pressure control valve, reference sign 12 denotes a 2–4 brake pressure line, reference sign 29 denotes a 2–4/B solenoid (corresponding to a solenoid valve b), reference sign 32 denotes a 2–4/B fail-safe valve (corresponding to a fail-safe valve d), reference sign 34 denotes a 2–4/B amplifier valve, reference sign 35 denotes a 2–4/B first fail-safe valve (corresponding to a first fail-safe directional control valve d1), reference sign 36 denotes a 2–4/B second fail-safe valve (corresponding to a second fail-safe directional control valve d2), reference sign 37 denotes a fail-safe pressure valve (corresponding to a fail-safe pressure valve f in FIG. 1), reference sign 38 denotes a 2–4/B solenoid pressure line (simply a solenoid pressure line), reference sign 39 denotes a 2–4/B amplifier valve input pressure line (simply, an amplifier valve input pressure line corresponding to an input pressure line e), reference sign 40 denotes a communicating line intercommunicating the first and second fail-safe valves 35 and 36, reference sign 41 denotes a fail-safe pressure line, and reference sign 42 denotes a drain line or a drain port. In all of the drawings, X denotes a drain line or a drain port through which oil is directed to a hydraulic oil tank (not shown for the sake of illustrative simplicity). As previously discussed in reference to the logical table of FIG. 3, the 2–4/B is applied when the transmission is in the D range and 2nd gear or in the D range and 4th gear, and released when the transmission in the D range and 1st gear or in the D range and 3rd gear. The 2–4/B solenoid valve 29 is driven by the solenoid drive current from the ATCU 17, to create the solenoid pressure $P_{SOL}$. The spool of the previously-noted 2–4/B amplifier valve 34 can be positioned by using both the solenoid pressure $P_{SOL}$ and the 2–4 brake pressure $P_{2-4/B}$ (corresponding to an output pressure of the amplifier valve 34). That is, the two opposing pressures $P_{SOL}$ and $P_{2-4/B}$ function as operating signal pressures for adjusting the spool position of the amplifier valve 34. Depending on these two operating signal pressures $P_{SOL}$ and $P_{2-4/B}$, the 2–4/B amplifier valve 34 creates the 2–4 brake pressure $P_{2-4/B}$ applied to the 2–4 brake (2–4/B).

The 2–4/B first fail-safe valve 35 of the fail-safe valve 32 serves to forcibly drain the 2–4 brake pressure $P_{2-4/B}$ from the 2–4 brake (2–4/B) by using the high clutch pressure $P_{H/C}$. The high clutch pressure $P_{H/C}$ corresponding to an engaging pressure of the high clutch H/C (corresponding to the second engaging element) which is changed from a disengaged state to an engaged state during shifting from second to third gear wherein the 2–4 brake (2–4/B) is changed from an applied state to a released state. The first fail-safe valve 35 uses the fail-safe pressure $P_{FE}$ as an operating signal pressure acting on one side of a spool land opposing the other side of the spool land on which the high clutch pressure $P_{H/C}$ (corresponding to a second engaging-element pressure Pc2) is applied. The first fail-safe valve 35 is designed to be switched to a drain position, when the high clutch pressure $P_{H/C}$ is adjusted or regulated toward a specified fail-safe valve operating point pressure ranging from a shifting-period maximum pressure corresponding to a maximum pressure value of the high clutch pressure $P_{H/C}$ regulated during shifting from 2nd to 3rd gear to a maximum possible high clutch pressure (corresponding to a maximum possible engaging-element pressure). In order to forcibly drain the 2–4 brake pressure P2–4/B from the 2–4 brake during the shifting operation from 2nd to 3rd gear during which the 2–4 brake (2–4/B) is shifted from the applied state to the released state, the fail-safe valve 32 uses a low clutch pressure $P_{L/C}$ (corresponding to a third engaging-element pressure Pc3) of the low clutch L/C (a third engaging element), already held in its engaged state, in addition to the high clutch pressure $P_{H/C}$ (corresponding to the second engaging-element pressure Pc2). In the hydraulic control device of the embodiment, actually, the 2–4/B first fail-safe valve 35 uses the high clutch pressure $P_{H/C}$ (the second engaging-element pressure Pc2) and the fail-safe pressure $P_{FE}$ as two opposing operating signal pressures, while the 2–4/B second fail-safe valve 36 uses the low clutch pressure $P_{L/C}$ (the third engaging-element pressure Pc3) and the fail-safe pressure $P_{FE}$ as two opposing operating signal pressures. In other words, the hydraulic control device of the embodiment has an independent fail-safe valve construction (a two-valve construction) composed of the first and second fail-safe valves 35 and 36. As seen in FIG. 6, the first and second fail-safe valves 35 and 36 are disposed upstream of the 2–4/B amplifier valve 34. The previously-noted two fail-safe valves 35 and 36 function to forcibly drain the amplifier valve input pressure line 39 of the 2–4/B amplifier valve 34 during a fail-safe operating mode. The previously-discussed fail-safe pressure $P_{FE}$ serves as a switching pressure (an operating signal pressure) needed to switch a spool position of each of the first and second fail-safe valves 35 and 36. The fail-safe pressure $P_{FE}$ can be created by the fail-safe pressure valve 37. The fail-safe pressure valve 37 has a spool having the same pressure-intensifying-ratio characteristic as that of each of the amplifier valves, such as the L/C amplifier valve, the H/C amplifier valve, and the L&R/B amplifier valve. The fail-safe pressure valve 37 uses the line pressure $P_L$ as an input pressure. A pilot pressure $P_p$ and a spring force both act on one spool land of the fail-safe pressure valve 37. The other spool land has a land difference with respect to the one spool land of the valve 37 and receives the fail-safe pressure $P_{FE}$ corresponding to an output pressure of the valve 37. The operation of the fail-safe valve incorporated in the hydraulic control device of the embodiment is hereinafter described in detail.

[Fundamental Concept Concerning a Fail-safe Function of 2–4/B Fail-safe Valve]

In a forward range (or in a D range), either one of the first, second, third and fourth gear modes can be selected by way of a combination of applications (engagements) of the three engaging elements, namely the low clutch, the high clutch, and the 2–4 brake (see the preprogrammed logical table shown in FIG. 3). The respective selected gear position or the respective selected gear mode can be achieved by application of two engaging elements of the above-mentioned three engaging elements. Therefore, a fail-safe function (used for the 2–4/B) has to allow the 2–4 brake (2–4/B) to be released only when the low clutch L/C and the high clutch H/C are both engaged (or applied) simultaneously with each other. Basically, the 2–4 brake (2–4/B) is applied only in the forward range (D range), more precisely in the D range and second gear or in the D range and fourth gear (see the column related to 2–4/B of FIG. 3), and thus the D-range pressure $P_D$ is used as an initial hydraulic pressure for the fail-safe valve 32. On the other hand, the low-and-reverse brake fail-safe valve 33 is associated with the low-and-reverse brake (L&R/B) for the purpose of a fail-safe function for the L&R/B. As appreciated from the logical table of FIG. 3, the low-and-reverse brake (L&R/B) is never combined with the high clutch H/C or the 2–4 brake (2–4/B). Therefore, a fail-safe function required for the L&R/B has to allow the low-and-reverse brake (L&R/B) to be released only when at least one of the high clutch H/C and the 2–4 brake (2–4/B) is engaged (applied). Although it is not clearly shown in the drawings for the purpose of illustrative simplicity, the low-and-reverse fail-safe valve 33 also uses the previously-noted fail-safe pressure $P_{FE}$ created by the fail-safe pressure valve 37 as an operating signal pressure for shifting the spool position of the L&R/B fail-safe valve 33. That is to say, the concept of the hydraulic control device of the invention may be applied to a fail-safe operating mode forcible-draining action for the low-and-reverse brake (L&R/B).

[Fail-safe Valve Switching Action]

Figure 7A:
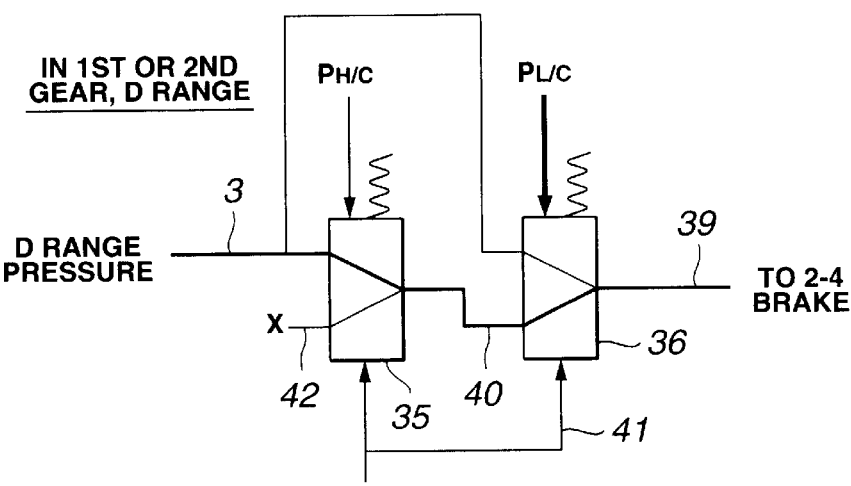
FIGS. 7A–7C are explanatory views showing valve-position switching operations of first and second fail-safe valves (35, 36), respectively in D range and either of 1st and 2nd gears, in D range and 3rd gear, and in D range and OD gear.

As shown in FIG. 7A, in D range and first gear or in D range and second gear, only the low clutch pressure $P_{L/C}$ acts on the 2–4/B second fail-safe valve 36 (see only one heavy-line arrow of FIG. 7A). Thus, the spool of the 2–4/B first fail-safe valve 35 is positioned to establish fluid-communication between the D-range pressure line 3 and the communicating line 40, whereas the spool of the 2–4/B second fail-safe valve 36 is positioned to establish fluid-communication between the communicating line 40 and the input pressure line 39. As a result, the D-range pressure $P_D$ (=line pressure) is fed from the range pressure line 3 through the communicating line 40 to the input pressure line 39.

Figure 7B:
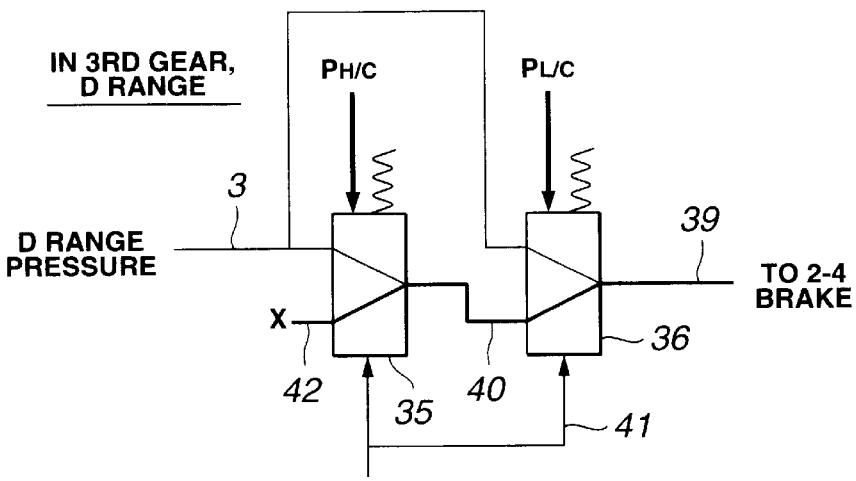

As shown in FIG. 7B, in D range and third gear, the low clutch pressure $P_{L/C}$ and the high clutch pressure $P_{H/C}$ act on the respective fail-safe valves 36 and 35 (see two heavy-line arrows of FIG. 7B). Thus, the spool of the 2–4/B first fail-safe valve 35 is positioned to establish fluid-communication between the drain line 42 and the communicating line 40, whereas the spool of the 2–4/B second fail-safe valve 36 remains positioned to establish fluid-communication between the communicating line 40 and the input pressure line 39. As a result, the input pressure line 39 communicates with the drain line 42 via the communicating line 40, and thus the input pressure to the 2–4/B amplifier valve 34 is forcibly drained.

Figure 7C:
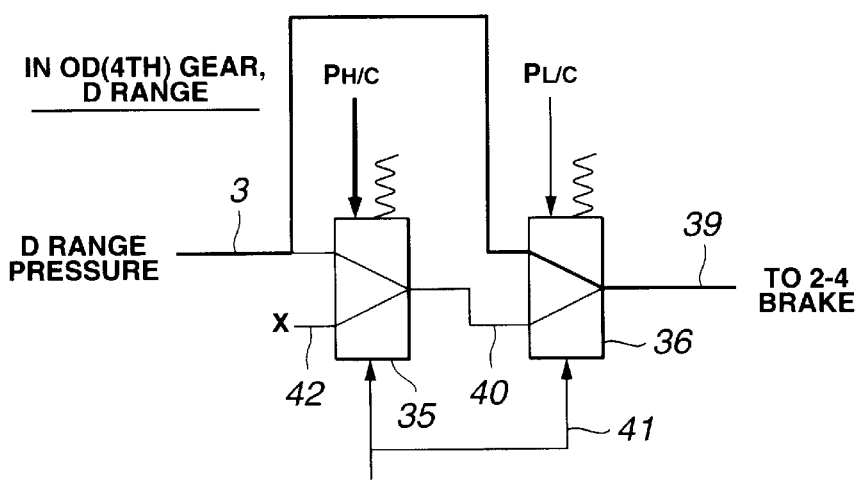

As shown in FIG. 7C, in D range and fourth gear (OD gear), there is no action of the low clutch pressure $P_{L/C}$ on the spool land of the 2–4/B second fail-safe valve 36. Thus, the 2–4/B second fail-safe valve 36 is switched to establish fluid-communication between the D-range pressure line 3 and the input pressure line 39. As a result of this, the D-range pressure $P_D$ is fed into the input pressure line 39, bypassing the 2–4/B first fail-safe valve 35.

[As Regards the Opposing Pressure of Fail-safe Valve]

Figure 8:
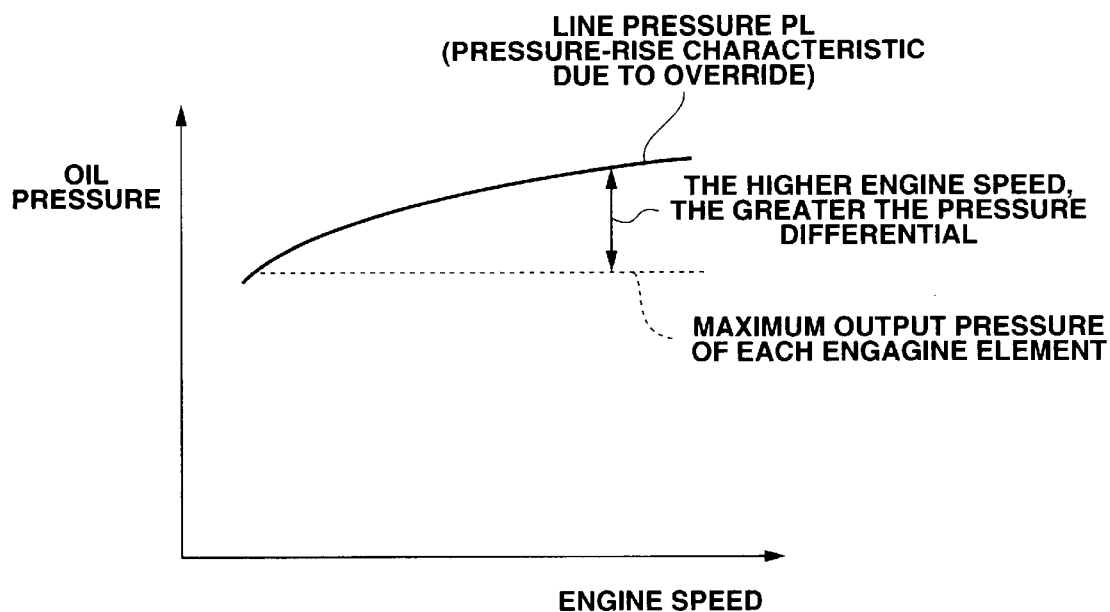
FIG. 8 is a line-pressure characteristic curve showing how the line pressure $P_L$ varies depending on engine speed, in case that the line pressure $P_L$ is used as the opposing pressure acting on the fail-safe valve employed in the hydraulic control device.
Figure 9:
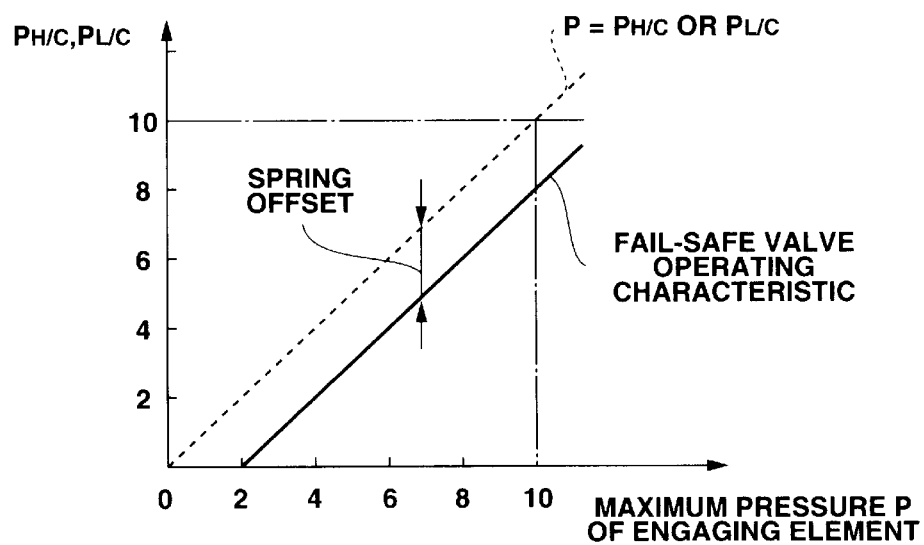
FIG. 9 is a characteristic map explaining the operation of the fail-safe valve (32) in case that the line pressure $P_L$ is used as the opposing pressure acting on the fail-safe valve (32) in the hydraulic control device of the embodiment.

Assuming that one of two opposing signal pressures for the valve spool of the fail-safe valve is a line pressure $P_L$, having a tendency to fluctuate depending on variations in engine speed, the fail-safe valve cannot operate under a particular condition wherein the line pressure $P_L$ exceeds a maximum engaging-element pressure. As shown in FIG. 8, the higher the engine speed (Ne), the higher the line pressure ($P_L$). In FIG. 8, the horizontal broken line indicates the maximum output pressure of each of the engaging elements, such as the low clutch L/C, the high clutch H/C, the reverse clutch R/C, the 2–4 brake(2–4/B), and the low-and-reverse brake (L&R/B). As appreciated from the engine-speed dependent line pressure ($P_L$) characteristic shown in FIG. 8, there is an increased tendency for the line pressure $P_L$ to exceed the maximum engaging-element pressure owing to override. In such a case, even when the engaging-element pressure becomes the maximum value, there is an increased tendency that the line pressure $P_L$ becomes above the maximum engaging-element pressure plus offset pressure which offset pressure (see FIG. 9) corresponds to a spring force of a spring acting on the other side of the valve spool of the fail-safe valve. According to the hydraulic control device of the embodiment, instead of the line pressure $P_L$, that is, in due consideration of variations or fluctuations in the line pressure $P_L$, the regulated fail-safe pressure $P_{FE}$ is used as the opposing pressure to each of the high clutch pressure $P_{H/C}$ acting on the other side of the spool land of the first fail-safe valve 35 and the low clutch pressure $P_{L/C}$ acting on the other side of the spool land of the second fail-safe valve 36, so that the valve switching point of each of the fail-safe valves 35 and 36 certainly occurs at the previously-discussed specified fail-safe valve operating point pressure higher than the shifting-period maximum engaging-element pressure obtainable during shifting from second to third gear and lower than the maximum possible engaging-element pressure (the maximum possible high clutch pressure). Owing to the optimal valve switching point, the timing of forcible draining of the 2–4 brake pressure P2–4/B can be reliably set at an optimal timing, that is, within a specified time period after the shifting from second to third gear has been terminated and before the high clutch pressure $P_{H/C}$ reaches the maximum high clutch pressure level. As set forth above, the hydraulic control device of the embodiment can attain an effective fail-safe function during the shifting operation from second to third gear, such that the forcible draining of the input pressure used to regulate the 2–4 brake pressure P2–4/B is provided at the above-mentioned optimal timing without exerting a bad influence upon the shifting operation from second to third gear and without introducing the automatic transmission interlock during a fail-safe operating mode needed to prevent the 2–4 brake pressure P2–4/B from remaining applied to the 2–4 brake.

[As Regards Two-valve Construction of Fail-safe Valve]

Figure 10:
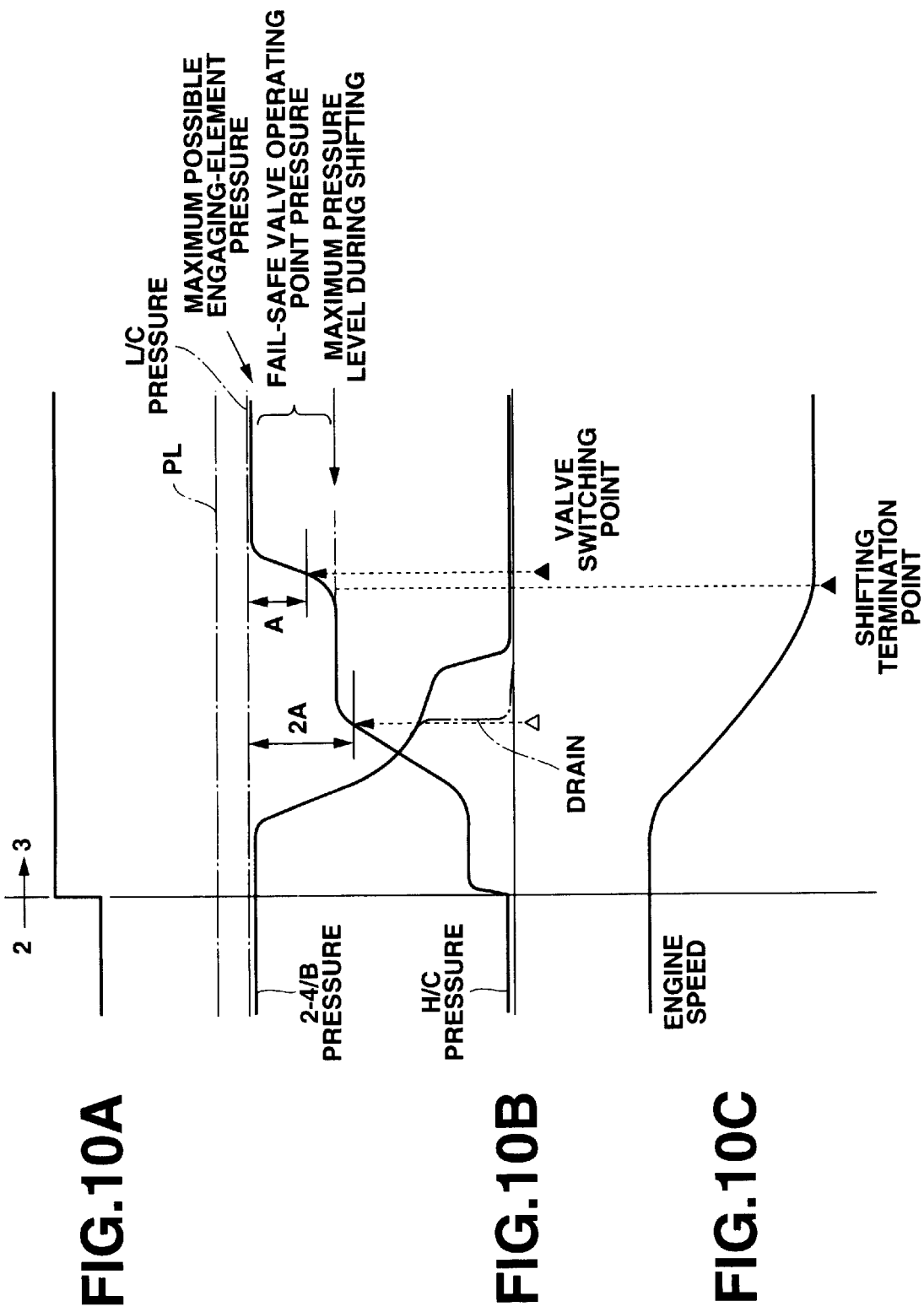
FIGS. 10A–10C are timing charts illustrating hydraulic pressure characteristics regarding a valve-position switching point of the fail-safe valve during shifting from 2nd to 3rd gear in the hydraulic control device of the embodiment.
Figure 11:
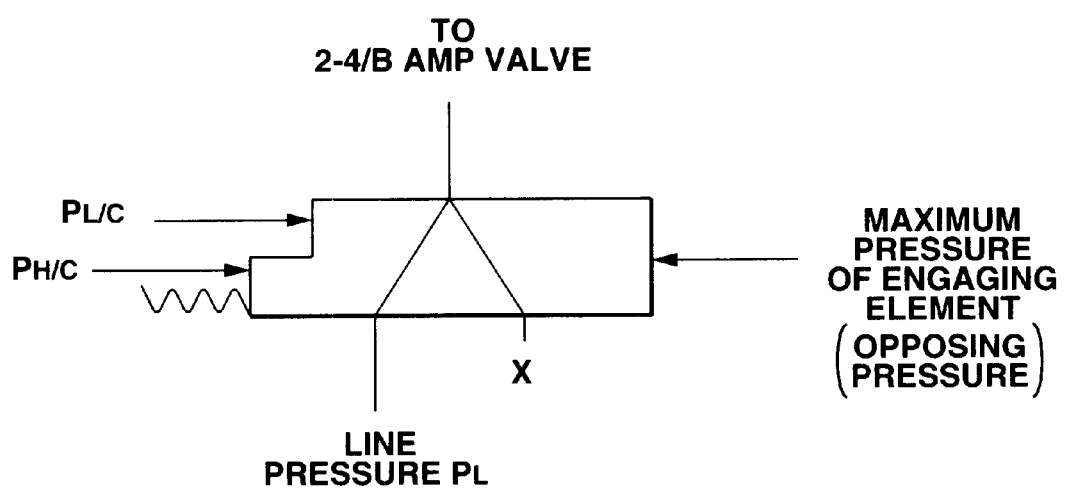
FIG. 11 is a partial hydraulic circuit used to explain demerits created on the assumption that a fail-safe valve is constructed by only a sole spool valve instead of two fail-safe valve construction (35, 36).
Figure 12:
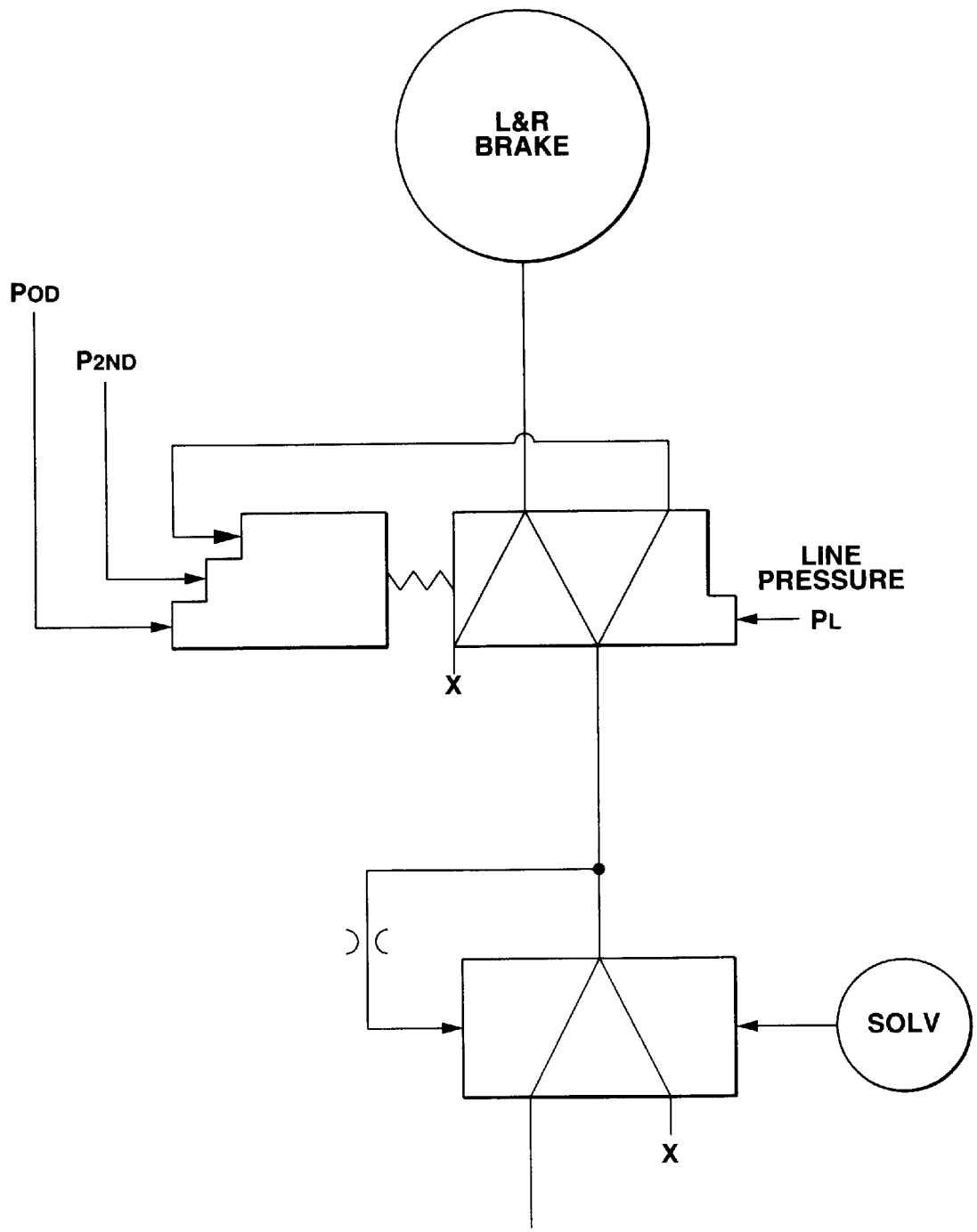
FIG. 12 is a schematic diagram showing a prior-art hydraulic control device of an automatic transmission.

As shown in FIGS. 10A–10C, for the purpose of eliminating a bad influence upon the automatic shifting operation (the automatic shifting from second to third gear) and preventing undesired transmission interlock, the operating condition of the first fail-safe valve 35 has to be determined, so that the first fail-safe valve 35 is operated or switched to the drain position only when the combined hydraulic pressure plus spring force acting on the spool of the first fail-safe valve 35 is within the specified fail-safe valve operating point pressure zone greater than a pressure level defined by the maximum high clutch pressure minus A (see FIG. 10B). Additionally, the operating condition of the second fail-safe valve 36 has to be determined, so that the second fail-safe valve 36 is operated or switched to the communication position (to the communicating line 40) only when the combined hydraulic pressure plus spring force acting on the spool of the second fail-safe valve 36 is within the specified fail-safe valve operating point pressure zone greater than a pressure level defined by the maximum low clutch pressure minus A (see FIG. 10B). In FIG. 10B, A denotes a predetermined pressure value. In the hydraulic control device of the embodiment, to ensure the previously-noted optimal timing for the forcible draining action, the two fail-safe valves 35 and 36 are used. Suppose the fail-safe valve 32 is comprised of a one spool-valve construction (see FIG. 11). In this case, assuming that the maximum high clutch pressure is equal to the maximum low clutch pressure, the fail-safe valve can be constructed as a single spool valve whose position is switched at a switching point defined by the maximum high clutch pressure plus maximum low clutch pressure minus 2A (see FIGS. 10B and 11). During shifting from second to third gear, the low clutch pressure $P_{L/C}$ applied to the low clutch L/C remains held at the maximum low clutch pressure, while the high clutch pressure $P_{H/C}$ applied to the high clutch H/C gradually rises owing to the upshifting operation to third gear. In the case of the previously-discussed valve switching characteristic of the fail-safe valve of the single spool valve construction, as seen from FIG. 10B, the fail-safe valve is, therefore, switched to the drain position, even when the combined hydraulic pressure plus spring force acting on the sole spool of the fail-safe valve is out of the specified fail-safe valve operating point pressure zone. As a result, the fail-safe valve is switched at a valve switching timing (see a switching point marked by Δ of FIG. 10B) earlier than the switching point marked by ▲. This advancement of the fail-safe valve switching timing to the pressure drain position allows the 2–4 brake pressure P2–4/B to be forcibly drained from the 2–4 brake during the shifting from second to third gear. This exerts a bad influence upon the shifting control. To avoid this, in lieu of the switching point defined by the maximum high clutch pressure plus maximum low clutch pressure minus 2A, another switching point, which is defined by the maximum high clutch pressure plus maximum low clutch pressure minus A, may be used. In the case of the fail-safe valve of the sole spool construction having the valve-switching characteristic defined by the maximum high clutch pressure plus maximum low clutch pressure minus A, however, in the case that the low clutch pressure $P_{L/C}$ drops to a pressure level lower than the maximum low clutch pressure minus A/2 and additionally the high clutch pressure $P_{H/C}$ drops to a pressure level lower than the maximum high clutch pressure minus A/2 owing to an increase in oil leakage with the lapse of time, the combined hydraulic pressure plus spring force acting on the right-hand side (viewing FIG. 11) of the spool land becomes less than the opposing pressure (corresponding to the maximum engaging-element pressure value) acting on the right-hand side of the spool land. Under these conditions, it is impossible to produce a sliding motion of the spool of the fail-safe valve toward the drain position. For the reasons set forth above, when the two engaging-element pressures, that is, the high clutch pressure $P_{H/C}$ and the low clutch pressure $P_{L/C}$, are used as operating signal pressures, it is difficult to construct the fail-safe valve by a sole spool valve.

As will be appreciated from the above, according the hydraulic control device of the embodiment, the 2–4 brake first fail-safe valve 35 is constructed as a mechanical valve capable of forcibly draining the 2–4 brake pressure $P_{2-4/B}$ from the 2–4 brake (2–4/B), utilizing the high clutch pressure $P_{H/C}$ of the high clutch brought into the engaged state from the disengaged state during shifting from second to third gear. As discussed above, the first fail-safe valve 35 uses the high clutch pressure $P_{H/C}$ (corresponding to the second engaging-element pressure Pc2) and the fail-safe pressure $P_{FE}$ (corresponding to the opposing pressure to the high clutch pressure $P_{H/C}$) as operating signal pressures. The first fail-safe valve 35 has a switching characteristic according to which the valve 35 is switched to the drain position, only when the combined hydraulic pressure and spring force acting on the spool of the first fail-safe valve 35 has been changed within toward the specified fail-safe valve operating point pressure zone higher than a maximum value of the high clutch pressure regulatable during shifting from second to third gear (that is, a shifting-period maximum high clutch pressure) and lower than the maximum possible high clutch pressure. Thus, the hydraulic control device of the embodiment can attain a fail-safe function that allows the 2–4 brake pressure $P_{2-4/B}$ to be forcibly drained from the 2–4 brake at an optimal timing at which the shifting control from second to third gear is not affected adversely and there is less possibility of an undesirable 2–4 brake interlock. According to the hydraulic control device of the embodiment, during the shifting from second to third gear, the 2–4 brake pressure P2–4/B is forcibly drained from the 2–4 brake by using the low clutch pressure $P_{L/C}$ of the low clutch already engaged, in addition to the use of the high clutch pressure $P_{H/C}$. Actually, the hydraulic control device of the embodiment has an independent fail-safe valve construction (a two-valve construction) composed of a 2–4 brake first fail-safe valve 35 having a spool operable by the second engaging-element pressure Pc2 (the high clutch pressure $P_{H/C}$) and the regulated fail-safe pressure $P_{FE}$, both serving as operating signal pressures for the first fail-safe valve, and a 2–4 brake second fail-safe valve 36 having a spool operable by the third engaging-element pressure Pc3 (the low clutch pressure $P_{L/C}$) and the fail-safe pressure $P_{FE}$, both serving as operating signal pressures for the second fail-safe valve. A fail-safe operating mode for the 2–4 brake can be certainly reliably achieved by using the two engaging-element pressures Pc2 and Pc3 ($P_{H/C}$ and $P_{L/C}$). Additionally, as shown in FIG. 6, each of the first and second fail-safe valves 35 and 36 is constructed by a spool valve having no land difference, and therefore there is less possibility of a mechanical trouble in each of the first and second fail-safe valves, such as a sticking spool. Furthermore, in the hydraulic control device of the embodiment, the first and second fail-safe valves 35 and 36 are both disposed upstream of the 2–4/B amplifier valve 34, and also during the fail-safe operating mode the two fail-safe valves 35 and 36 are designed to forcibly drain the amplifier valve input pressure line 39 of the 2–4/B amplifier valve 34. Therefore, even in presence of the system failure that the spool of the 2–4/B amplifier valve 34 is stuck in the middle spool position and thus an unexpected hydraulic pressure takes place, the hydraulic control device of the embodiment can disengage the 2–4 brake (2–4/B). Moreover, the hydraulic control device of the embodiment uses the fail-safe pressure valve 37 capable of creating the fail-safe pressure $P_{FE}$ acting as a switching pressure for each of the first and second fail-safe valves 35 and 36, and having a spool of the same intensified-pressure ratio (or the same amplified-pressure ratio) as that of each of the amplifier valves, such as the L/C amplifier valve, the H/C amplifier valve, and the L&R/B amplifier valve. Also, the fail-safe pressure valve 37 uses the line pressure $P_L$ as an input pressure, and receives at one spool land the pilot pressure $P_p$ and the spring force and receives at the other land (having a land difference with respect to the one spool land of the valve 37) the fail-safe pressure $P_{FE}$ serving as an output pressure. In comparison with such a case that the line pressure $P_L$ itself is used as the opposing pressure, the operation of the fail-safe valve is unaffected by variations or fluctuations in the line pressure $P_L$ based on variations in engine speed, thus ensuring a reliable valve switching operation of each of the first and second fail-safe valves 35 and 36 at a set switching point.

In the shown embodiment, although the fail-safe valve unit 32 has a two-valve construction composed of first and second fail-safe valves 35 and 36, in lieu thereof the fail-safe valve unit may be constructed by three or more fail-safe valves.

Figure 1:
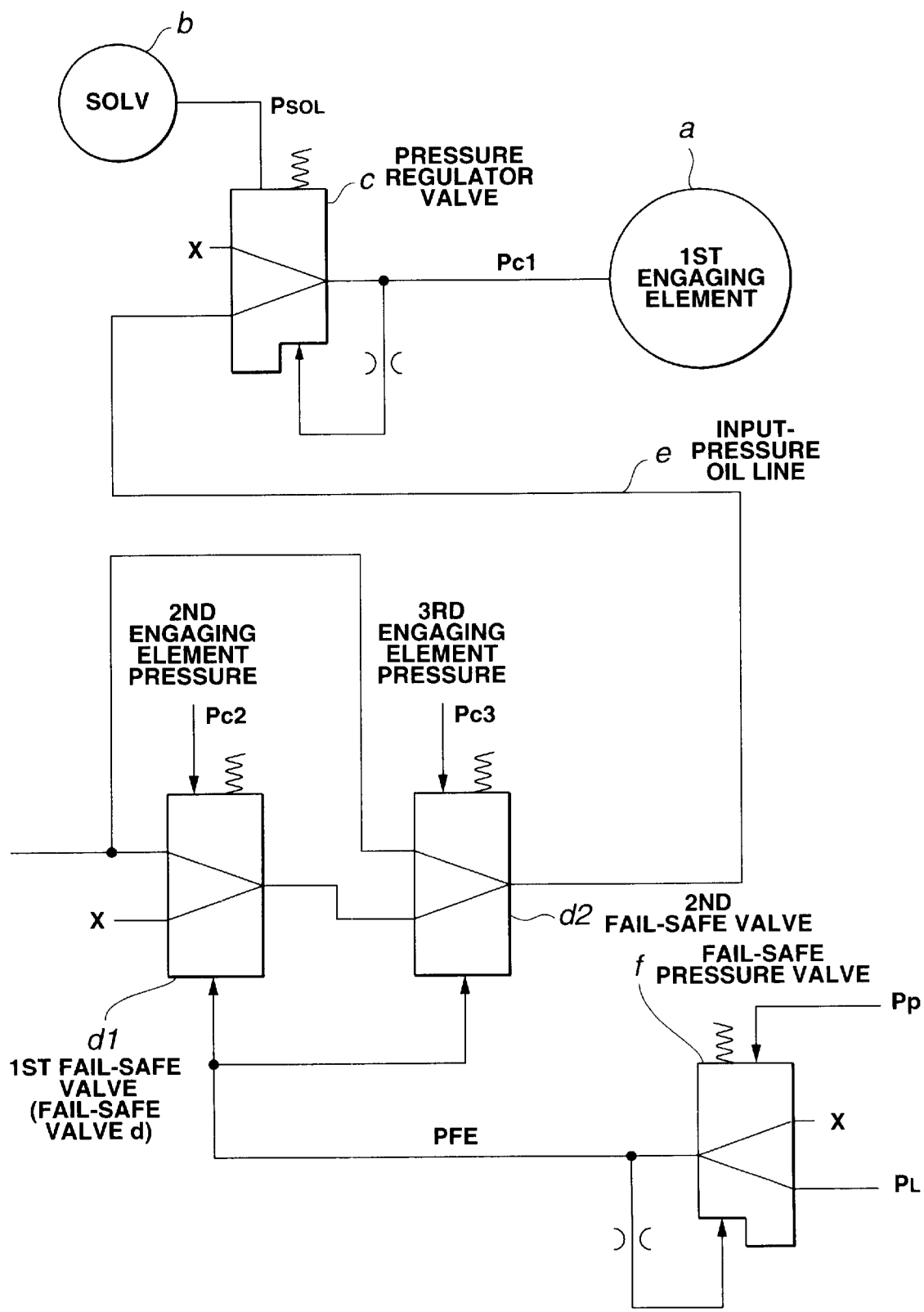
FIG. 1 is a hydraulic circuit diagram illustrating the fundamental concept of a hydraulic control vice of an electronically-controlled automatic transmission (ECT transmission) of the invention.

Returning to FIG. 1, the fundamental concept of the hydraulic control device of the ECT transmission of the invention is shown as a schematic hydraulic arrangement. As shown in FIG. 1, a hydraulic control device of the invention can be applied to an automatic transmission which employs a first engaging element a engageable or disengageable by a first engaging-element pressure Pc1 controlled or regulated during shifting, a solenoid valve b creating a solenoid pressure $P_{SOL}$ in response to a solenoid drive signal, and a pressure regulator valve c creating the first engaging-element pressure Pc1 applied to the first engaging element a by using the solenoid pressure $P_{SOL}$ and a regulated line pressure (Pc1) corresponding to an output pressure thereof as operating signal pressures. A fail-safe valve d is provided to forcibly drain the first engaging-element pressure Pc1 from the first engaging element a by using a second engaging-element pressure Pc2 applied to a second engaging element brought into an engaging state from a releasing state during a shifting operation that the first engaging element a is changed from an engaged state to a disengaged state. According to the hydraulic control device of the invention, the fail-safe valve d is constructed as a mechanical spool valve which has an axially slidable spool and uses the second engaging-element pressure Pc2 and its opposing pressure ($P_{FE}$) acting on the spool in opposite directions as operating signal pressures. The fail-safe valve d is designed to switch to a drain position when the second engaging-element pressure Pc2 has been regulated toward a specified fail-safe valve operating point pressure higher than a maximum pressure value of the second engaging-element pressure regulated during the previously-noted shifting operation and lower than a maximum possible engaging-element pressure of the second engaging element. Thus, the hydraulic control device of the invention can optimize the shifting control and prevent the undesired transmission interlock even in presence of the system failure such as a sticking spool, thus ensuring a superior fail-safe function according to which the first engaging-element pressure Pc1 can be forcibly drained at an optimal timing. Furthermore, in order to forcibly drain the first engaging-element pressure Pc1 during the previously-noted shifting operation, the fail-safe valve d also uses a third engaging-element pressure Pc3 applied to a third engaging element already kept in an engaged state, in addition to the second engaging-element pressure Pc2. The fail-safe valve d has at least two valve construction including at least a first fail-safe valve d1 having a spool operable by the second engaging-element pressure Pc2 and the opposing pressure (fail-safe pressure $P_{FE}$), both serving as operating signal pressures, and a second fail-safe valve d2 having a spool operable by the third engaging-element pressure Pc3 and the opposing pressure (fail-safe pressure $P_{FE}$), both serving as operating signal pressures. The first and second fail-safe valves d1 and d2 are operable independently of each other, respectively in response to the first combined pressure group (Pc2, $P_{FE}$) and to the second combined pressure group (Pc3, $P_{FE}$). By using the two different engaging-element pressures Pc2 and Pc3, it is possible to attain the fail-safe operating mode for the first engaging element a at the optimal timing. In addition, each of the first and second fail-safe valves can be constructed by a spool valve having no land difference, and thus there is less problem of spool sticking in the middle axial position, and thereby enhancing a system reliability. Moreover, the fail-safe valve d is fluidly disposed upstream of the pressure regulator valve c. During the fail-safe operating mode, the fail-safe valve d operates to forcibly drain an input pressure line e for the pressure regulator valve c. Therefore, even in presence of the system failure such as a spool sticking of the pressure regulator valve c in the middle spool position, that is an unexpected hydraulic pressure rise, the hydraulic control device of the invention can certainly release the first engaging element a. Also provided is a fail-safe pressure valve f with a spool having the same pressure-intensifying ratio as the pressure regulator valve c. The fail-safe pressure valve f uses a line pressure $P_L$ as an input pressure. A pilot pressure $P_p$ acts on the spool of the fail-safe pressure valve f in one axial direction, while an output pressure (fail-safe pressure $P_{FE}$) of the fail-safe pressure valve f acts on the spool in the opposite axial direction. In comparison with a case that the line pressure $P_L$ itself is used as an opposing pressure, there is less possibility that the hydraulic control system is affected by fluctuations in the line pressure $P_L$ based on variations in engine speed. Therefore, it is possible to reliably switch the fail-safe valve d at a set valve switching point.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic control device of an automatic transmission having a first engaging element engageable or disengageable by a first engaging-element pressure regulated during shifting, a solenoid valve creating a solenoid pressure in response to a solenoid drive signal, and a pressure regulator valve creating the first engaging-element pressure applied to the first engaging element by using the solenoid pressure and a regulated line pressure thereof as operating signal pressures, comprising:

a fail-safe valve adapted to forcibly drain the first engaging-element pressure from the first engaging element by using a second engaging-element pressure applied to a second engaging element brought into an engaging state from a releasing state during a shifting operation during which the first engaging element is changed from an engaged state to a disengaged state; said fail-safe valve including a spool and using the second engaging-element pressure acting on the spool in one axial direction and an opposing pressure acting on the spool in the opposing direction as operating signal pressures; and said fail-safe valve switching to a drain position when the second engaging-element pressure is regulated within toward a specified fail-safe valve operating point pressure higher than a maximum pressure value of the second engaging-element pressure regulated during the shifting operation and lower than a maximum possible engaging-element pressure.

2. The hydraulic control device as claimed in claim 1, wherein said fail-safe valve uses a third engaging-element pressure applied to a third engaging element already kept in an engaged state in addition to the second engaging-element pressure to forcibly drain the first engaging-element pressure during the shifting operation, and said fail-safe valve has at least two valve construction including at least a first fail-safe valve having a spool operable by the second engaging-element pressure and the opposing pressure, both serving as operating signal pressures for the first fail-safe valve, and a second fail-safe valve having a spool operable by the third engaging-element pressure and the opposing pressure, both serving as operating signal pressures for the second fail-safe valve, and the first and second fail-safe valves are operable independently of each other.

3. The hydraulic control device as claimed in claim 1, wherein said fail-safe valve is disposed upstream of the pressure regulator valve, and said fail-safe valve operates to forcibly drain an input pressure line for the pressure regulator valve, during a fail-safe operating mode.

4. The hydraulic control device as claimed in claim 1, wherein a fail-safe pressure valve is provided to create the opposing pressure acting on the spool of said fail-safe valve in the opposing direction, and said fail-safe pressure valve has a spool having a same pressure-intensified ratio as the pressure regulator valve and uses a line pressure as an input pressure, and the spool of said fail-safe pressure valve receives at one end a pilot pressure acting in one axial direction and receives at another end an output pressure acting in the opposite direction.

5. The hydraulic control device as claimed in claim 2, wherein the automatic transmission comprises an electronically-controlled automatic transmission having the first, second, and third engaging elements, and either one of first, second, third, and fourth gear modes is selected by a combination of applications of the first, second, and third engaging elements.

6. The hydraulic control device as claimed in claim 5, wherein the first fail-safe valve comprises a mechanical spool valve having a spool and a spring whose spring force acts on the spool of the first fail-safe valve in a direction of action of the second engaging-element pressure, and the second fail-safe valve comprises a mechanical spool valve having a spool and a spring whose spring force acts on the spool of the second fail-safe valve in a direction of action of the third engaging-element pressure, and the first and second fail-safe valves are communicated through a communicating line, so that, during the shifting operation, the spool of the first fail-safe valve is positioned to establish fluid-communication between a drain line and the communicating line, while the spool of the second fail-safe valve is positioned to establish fluid-communication between the communicating line and the input pressure line for the pressure regulator valve, to forcibly drain the input pressure line.

7. The hydraulic control device as claimed in claim 6, wherein the first engaging element includes a 2–4 brake, the second engaging element includes a high clutch, and the third engaging element includes a low clutch, and the specified fail-safe valve operating point pressure ranges from a maximum pressure value of a high clutch pressure regulated during the shifting operation to a maximum possible high clutch pressure.

* * * * *